(12) United States Patent
Okuda et al.

(10) Patent No.: US 12,405,442 B2
(45) Date of Patent: Sep. 2, 2025

(54) LENS APPARATUS, IMAGE PICKUP APPARATUS, CONTROL METHOD FOR LENS APPARATUS, AND MEDIUM STORING PROGRAM

(71) Applicant: CANON KABUSHIKI KAISHA, Tokyo (JP)

(72) Inventors: Toshihiro Okuda, Tochigi (JP); Kunihiko Sasaki, Tochigi (JP); Shu Ito, Tochigi (JP); Tadanori Okada, Tochigi (JP); Takehiko Sato, Tochigi (JP); Toshimune Nagano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 809 days.

(21) Appl. No.: 17/700,854

(22) Filed: Mar. 22, 2022

(65) Prior Publication Data

US 2022/0308311 A1 Sep. 29, 2022

(30) Foreign Application Priority Data

Mar. 24, 2021 (JP) .................................. 2021-049738

(51) Int. Cl.
  *G02B 7/10* (2021.01)
  *G03B 5/02* (2021.01)
  (Continued)

(52) U.S. Cl.
  CPC ................. *G02B 7/10* (2013.01); *G03B 5/02* (2013.01); *G03B 13/34* (2013.01);
  (Continued)

(58) Field of Classification Search
  CPC . G02B 7/10; G02B 7/28; G02B 7/102; G02B 7/282; G03B 5/02;
  (Continued)

(56) References Cited

U.S. PATENT DOCUMENTS 5,302,991 A * 4/1994 Nakayama ............. G02B 7/102
  396/81
5,455,649 A * 10/1995 Yamada .................. G02B 7/102
  348/347

(Continued)

FOREIGN PATENT DOCUMENTS

JP 2006227399 A 8/2006
JP 2008197617 A 8/2008

(Continued)

OTHER PUBLICATIONS

Yong-Sheng Chen et al., Camera Calibration with a Motorized Zoom Lens, 2000, pp. 495-498 [online], [retrieved Feb. 17, 2025], retrieved from the Internet <URL: https://ieeexplore.ieee.org/stamp/stamp.jsp?tp=&arnumber=902965>. (Year: 2000).*

(Continued)

*Primary Examiner* — Thomas K Pham
(74) *Attorney, Agent, or Firm* — ROSSI, KIMMS & McDOWELL LLP (57) ABSTRACT

A lens apparatus includes: a first holder holding a first lens unit and being moved in optical axis direction manually or by an external driver; a second holder holding a second lens unit and being electrically moved in optical axis direction; a first and second detectors respectively detecting positions of the first and second holders; a driving unit configured to move the second holder in optical axis direction; and a controller controlling the driving unit, in which movable ranges of the first and second holders overlap each other in optical axis direction; in which a position of the second holder in optical axis direction corresponds to a position of a movable portion of the driving unit; and wherein the controller changes a control of the driving unit based on a detection of the first and second detectors before the second holder interferes with the first holder.

18 Claims, 9 Drawing Sheets

(51) Int. Cl.
  *G03B 13/34* (2021.01)
  *H02K 41/035* (2006.01)
  *H02N 2/02* (2006.01)
(52) U.S. Cl.
  CPC ......... *H02K 41/0356* (2013.01); *H02N 2/026* (2013.01); *G03B 2205/0046* (2013.01); *G03B 2205/0069* (2013.01)
(58) Field of Classification Search
  CPC .... G03B 2205/0007; G03B 2205/0046; G03B 2205/0069; G03B 13/34; G03B 13/36; H02K 41/0356; H02N 2/026
  See application file for complete search history.

(56) References Cited

U.S. PATENT DOCUMENTS

| | | | | |
|---|---|---|---|---|
| 5,786,941 A * | 7/1998 | Kuwana | G02B 7/102 | 359/683 |
| 5,842,057 A * | 11/1998 | Nomura | H05B 41/325 | 396/269 |
| 5,999,748 A * | 12/1999 | Nomura | G02B 7/102 | 396/448 |
| 6,993,256 B2 * | 1/2006 | Ogg | G02B 7/04 | 359/698 |
| 7,126,761 B2 * | 10/2006 | Hakko | G02B 15/144107 | 359/686 |
| 7,574,126 B2 * | 8/2009 | Honjo | G02B 7/102 | 396/97 |
| 7,609,957 B2 | 10/2009 | Sugiura | | |
| 8,988,594 B2 * | 3/2015 | Katsuyama | G02B 7/102 | 348/240.3 |
| 9,294,658 B2 * | 3/2016 | Adachi | G03B 3/10 | |
| 2006/0034001 A1 * | 2/2006 | Nagai | G02B 7/102 | 359/694 |
| 2008/0043348 A1 * | 2/2008 | Imagawa | G02B 7/102 | 359/813 |
| 2009/0231731 A1 * | 9/2009 | Sasaki | G02B 7/102 | 359/701 |
| 2009/0231732 A1 * | 9/2009 | Sasaki | G02B 7/102 | 359/701 |
| 2012/0162781 A1 * | 6/2012 | Nakagawa | G02B 7/102 | 359/696 |
| 2014/0247384 A1 * | 9/2014 | Hokkezu | G03B 3/10 | 348/345 |
| 2022/0350222 A1 * | 11/2022 | Sasaki | G03B 5/02 | |

FOREIGN PATENT DOCUMENTS

| | | |
|---|---|---|
| JP | 2010139720 A | 6/2010 |
| JP | 2010145503 A | 7/2010 |
| JP | 2017227825 A | 12/2017 |
| JP | 2018081208 A | 5/2018 |

OTHER PUBLICATIONS

Kristin Lewotsky, Tutorial: The Basics of Stepper Motors—Part I, 2014, pp. 1-12 [online], [retrieved Feb. 17, 2025], retrieved from the Internet <URL: https://www.automate.org/motion-control/industry-insights/tutorial-the-basics-of-stepper-motors-part-i>. (Year: 2014).*
Danielle Collins, What are Auto-tuning Methods for Servo Drives, 2019, pp. 1-7 [retrieved Feb. 20, 2025], retrieved from the Internet <URL: https://www.motioncontroltips.com/auto-tuning-methods-servo-drives/>. (Year: 2019).*
English translation of JP 2010-139720 A, obtained from Google Patents, Feb. 16, 2025. (Year: 2025).*
English translation of JP 2010-145503 A, obtained from Patent Translate, Feb. 16, 2025. (Year: 2025).*

* cited by examiner

LENS APPARATUS, IMAGE PICKUP APPARATUS, CONTROL METHOD FOR LENS APPARATUS, AND MEDIUM STORING PROGRAM

BACKGROUND OF THE INVENTION

Field of the Invention

The present invention relates to a lens apparatus, an image pickup apparatus, control methods for lens apparatus, and programs.

Description of the Related Art

To shorten n total length of a zoom lens barrel in a shortest state, a technique is known which enables a lens unit which is moved manually or by an external driving unit to enter a movable range of a lens unit which is movable by an electric driving unit. Japanese Patent Application Laid-Open No. 2008-197617 discloses a lens apparatus including a first lens unit which is manually moved in an optical axis direction and a second lens unit which is moved by a driving force of a driving member via a transmitting member. When a second holding member for holding the second lens unit interferes with a first holding member for holding the first lens unit, an urging member is displaced to absorb an impact between the lens units.

Further, in the same structure as in Japanese Patent Application Laid-Open No. 2008-197617, Japanese Patent Application Laid-Open No. 2017-227825 proposes a method of changing a control of a stepping motor which serves as a driving unit in order to prevent the feedback control from becoming unstable when the biasing member is displaced.

In a configuration in which a lens unit which is moved manually or by an external driving unit enters a moving range of a lens unit which is moved by electric drive control, a buffer structure using an urging member as disclosed in Japanese Patent Application Laid-Open No. 2008-197617 is adopted. On the other hand, neither Japanese Patent Application Laid-Open No. 2008-197617 nor Japanese Patent Application Laid-Open No. 2017-227825 discloses a structure in which a lens unit enters the moving range and does not have a buffer structure.

Japanese Patent Application Laid-Open No. 2017-227825 relates to a change in control after collision by detecting a change due to collision, and problems remain from a viewpoint of avoiding collision as much as possible.

SUMMARY OF THE INVENTION

The present invention provides a compact lens apparatus that improves driving accuracy and image quality in a lens apparatus having a range where a moving range of an electrically driven lens unit and a moving range of a lens unit which is moved manually or by an external driving unit overlap each other.

A lens apparatus of the present invention includes: a first holding member holding a first lens unit and configured to be moved in a direction of an optical axis manually or by an external driving unit; a second holding member holding a second lens unit and configured to be electrically moved in the direction of the optical axis; a first detector configured to detect a position of the first holding member; a second detector configured to detect a position of the second holding member; a driving unit configured to move the second holding member in the direction of the optical axis; and a controller configured to control the driving unit, in which a movable range of the first holding member and a movable range of the second holding member have regions that overlap each other in the direction of the optical axis; in which a position of the second holding member in the direction of the optical axis corresponds to a position of a movable portion of the driving unit; and in which the controller changes a control of the driving unit based on a detection result of the first detector and the second detector before the second holding member interferes with the first holding member.

According to the present invention, in a lens apparatus has a range in which the moving range of an electrically controlled lens unit and a moving range of a lens unit which is moved manually or by an external driving unit overlap each other, it is possible to provide a compact lens apparatus that improves driving accuracy and image quality.

Further features of the present invention will become apparent from the following description of exemplary embodiments with reference to the attached drawings.

DESCRIPTION OF THE EMBODIMENTS

A preferred embodiment of the present invention will now be described in detail with reference to the accompanying drawings.

Embodiment 1

Figure 1:
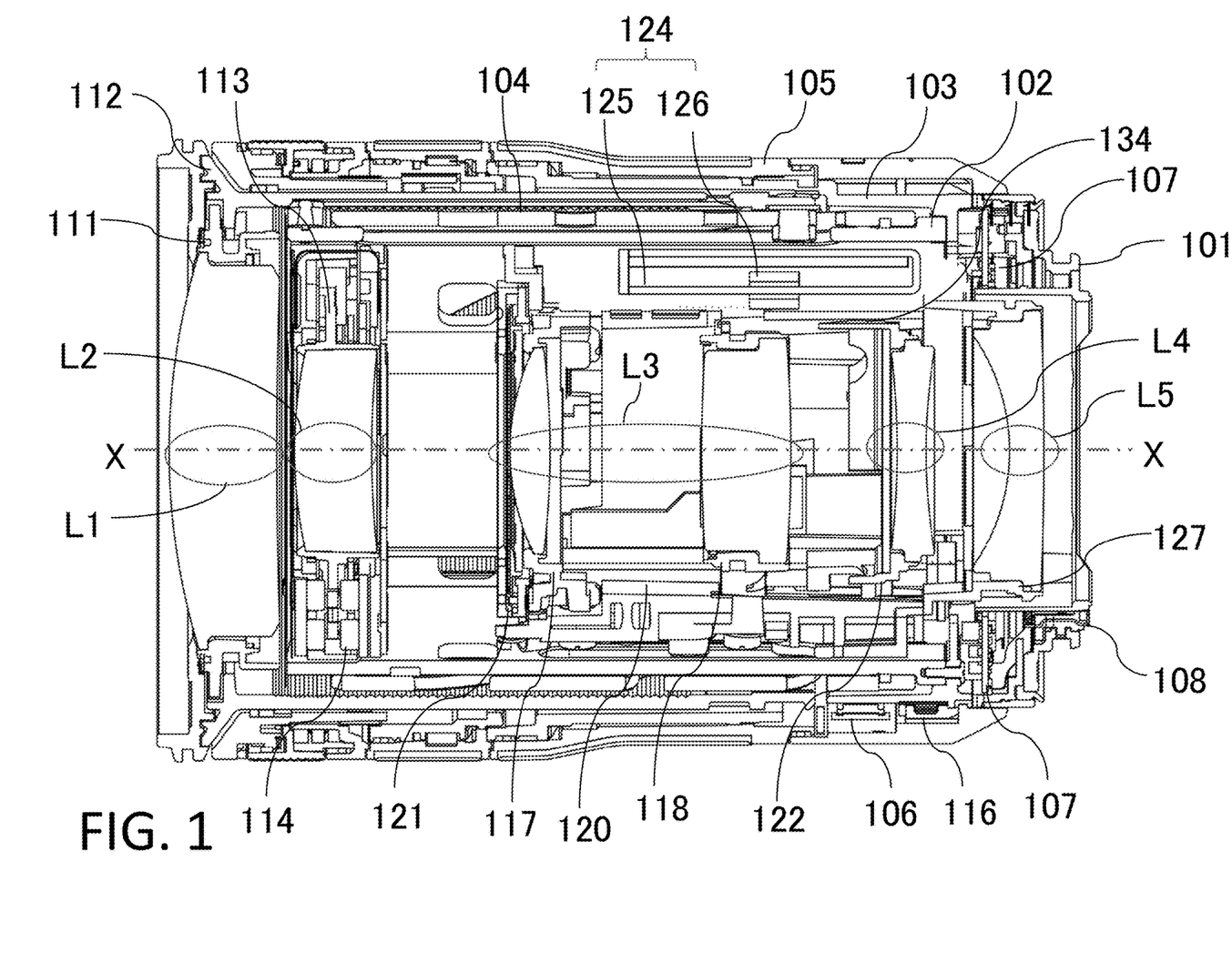
FIG. 1 is a cross-sectional view in a state of focusing at infinity in a wide angle end of a lens apparatus of Embodiment 1.
Figure 2:
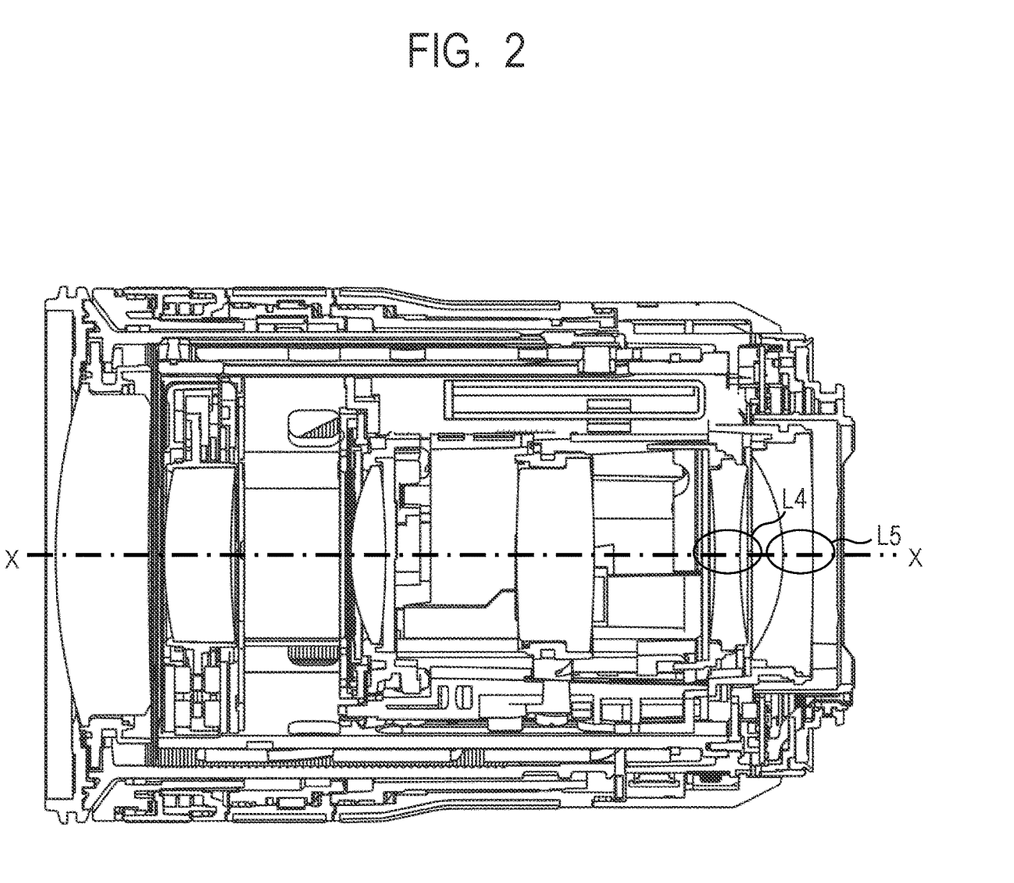
FIG. 2 is a cross-sectional view in a state of focusing at a close distance in the wide angle end of the lens apparatus of Embodiment 1.
Figure 3:
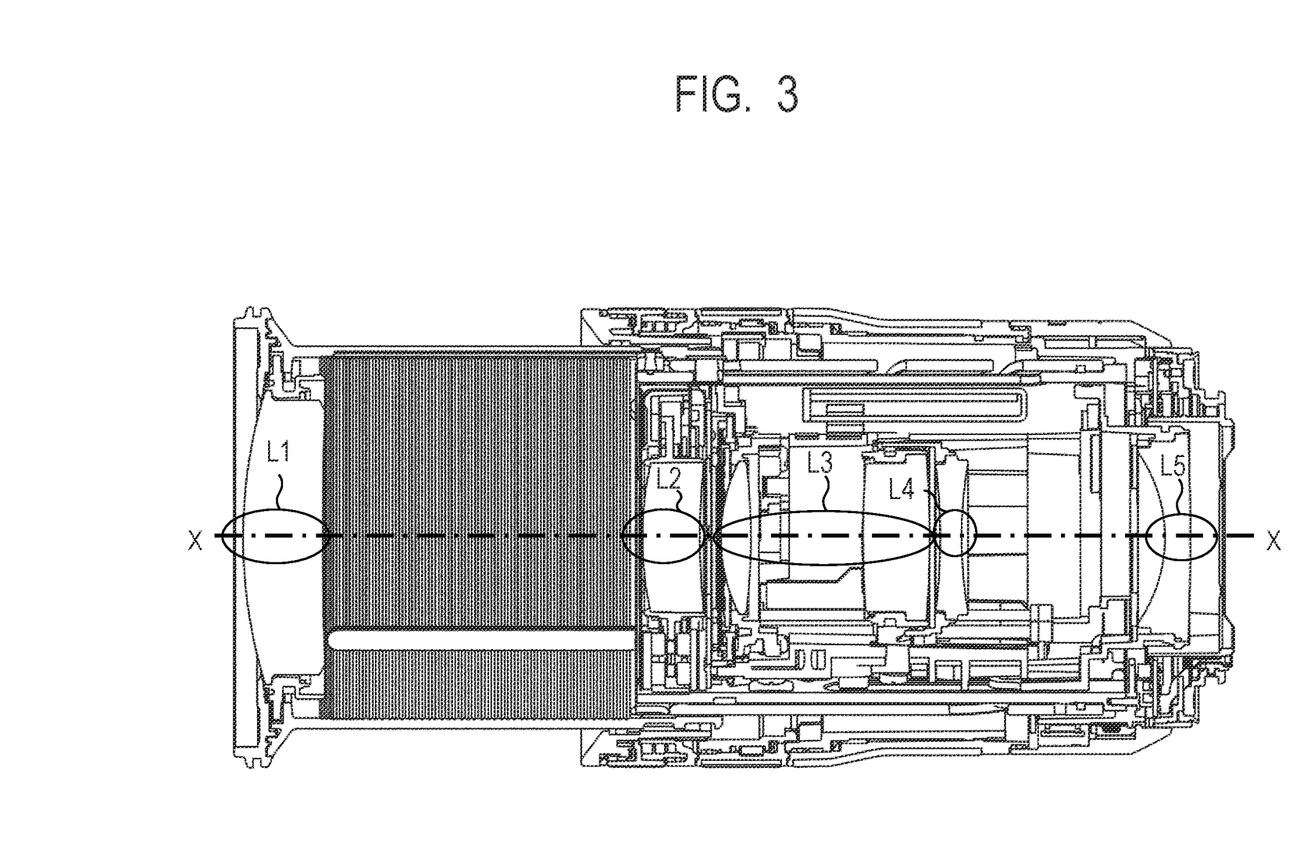
FIG. 3 is a cross-sectional view in a state of focusing at infinity in a telephoto end of the lens apparatus of Embodiment 1.
Figure 4:
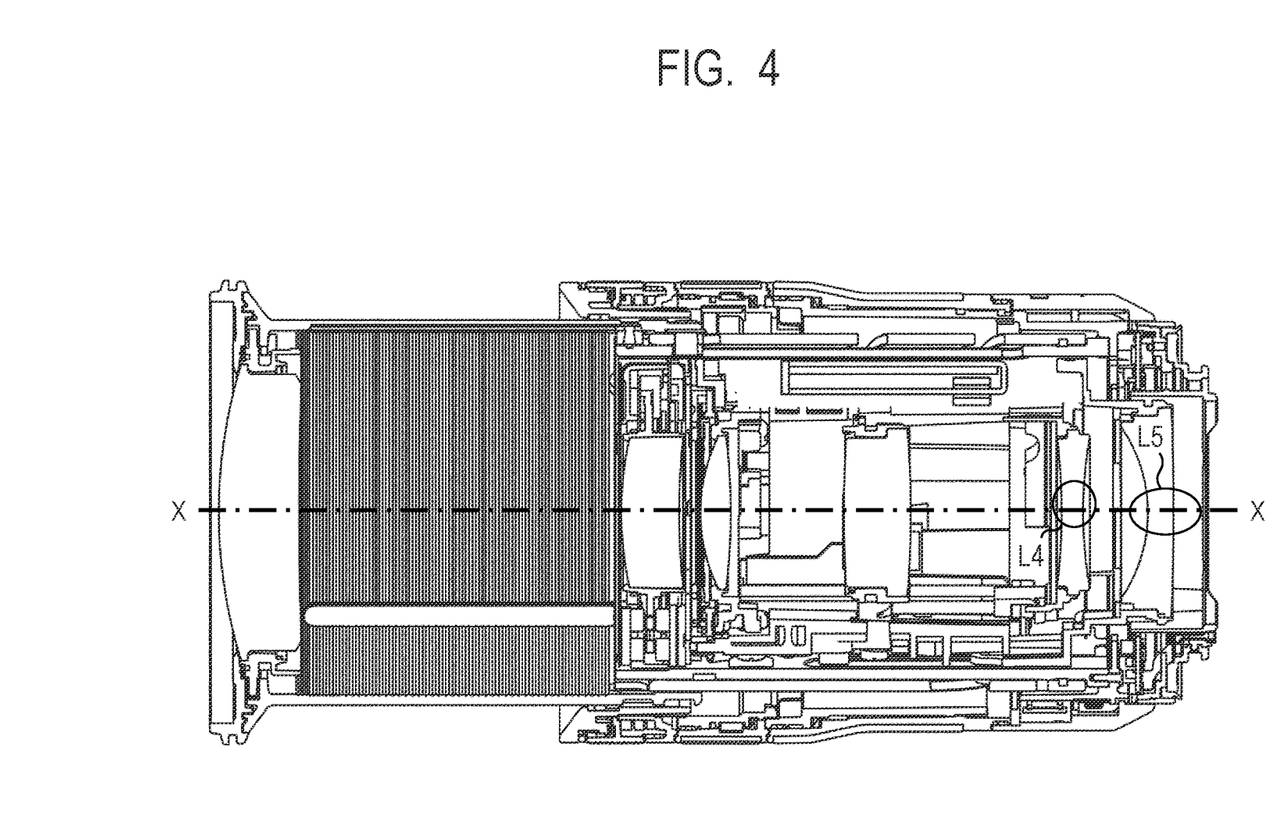
FIG. 4 is a cross-sectional view in a state of focusing at the close distance in the telephoto end of the lens apparatus of Embodiment 1.

A lens apparatus according to the first embodiment of the present invention will be described below. FIG. 1 is a sectional view of a lens apparatus which implements the present invention in a state of focusing at infinity in the wide angle end. FIG. 2 is a sectional view of the lens apparatus shown in FIG. 1 in a state of focusing at a close distance in the wide angle end. FIG. 3 is a sectional view of the lens apparatus shown in FIG. 1 in a state of focusing at infinity in the telephoto end. FIG. 4 is a sectional view of the lens apparatus shown in FIG. 1 in a state of focusing at a close distance in the telephoto end. In figures, the line indicated by X-X represents an optical axis.

In FIG. 1, the mount 101 is a member fixed to a camera body (not shown). The guide cylinder 102 is integrally fixed to the mount 101 together with a fixed barrel 103. A cam ring 104 is rotatably held around optical axis on the outer periphery of the guide cylinder 102. The cam ring 104 is connected to a zoom ring 105 rotatably held on the outer periphery of the fixed barrel 103 by a key member (not shown), and integrally rotates by operating the zoom ring 105 from the outside.

The zoom sensor 106 as a first detecting unit is attached to the fixed barrel 103 and can electrically detect a rotation angle of the zoom ring 105. The zoom sensor 106 is electrically connected to a control board 107 arranged in the vicinity of the mount 101, and transmits a focal length information in zooming to a control circuit. A contact block 108 is electrically connected to the control board 107, and the control board 107 receives communication to/from a camera body (not shown) and power supply.

The first lens unit L1 serving as a first zoom lens unit is fixed to the first lens unit barrel 111 serving as a first zoom holding member. The first lens unit barrel 111 is fixed to a rectilinear barrel 112.

The second lens unit L2 is held by the second lens unit barrel 113. The second lens unit barrel 113 is held by the shift unit 114 while being movably in a plane orthogonal to the optical axis. The shift unit 114 includes an actuator for driving the second lens unit barrel 113, a sensor for detecting a driving amount, and the like, and the shift unit 114 is fixed to the guide cylinder 102. The shift unit 114 is electrically connected to the control board 107. The control board 107 drives and controls the second lens unit barrel 113 so as to correct the blur based on the blur signal detected by the blur sensor 116 attached to the fixed barrel 103.

The third lens unit L3 is held by a 3A lens unit barrel 117 and a 3B lens unit barrel 118, and both are fixed to the third lens unit base barrel 120. An electromagnetic stop unit 121 is held by the third lens unit base barrel 120 and is electrically connected to the control board 107.

The fourth lens unit L4 is held by a fourth lens unit barrel 122, and the fourth lens unit barrel 122 serving as a second holding member is held movably in the optical axis direction by the third lens unit base barrel 120 by a first guide bar (not shown). The fourth lens unit L4 is a lens for focus adjustment and is driven in the optical axis direction by a voice coil motor (hereinafter referred to as VCM) 124 serving as a driving unit held by the third lens unit base barrel 120.28, The VCM 124 is composed of a coil provided on the fixed portion 125 and a magnet provided on the movable portion 126, and the movable portion 126 is driven in the optical axis direction by electromagnetic force. The coil is electrically connected to the control board 107 by a flexible printed circuit board (not shown).

The fifth lens unit L5 is held by the fifth lens unit barrel 127 serving as a first holding member.

The first lens unit L1, the third lens unit L3, and the fifth lens unit L5 are lenses moving for zooming, respectively, and a cam follower (not shown) is fixed to the rectilinear barrel 112, the third lens unit base barrel 120, and the fifth lens unit barrel 127. Each cam follower is engaged with a rectilinear groove provided in the guide cylinder 102 and a cam groove provided in the cam ring 104, and can move straight in optical axis direction by rotating the cam ring 104 with respect to the guide cylinder 102. With this configuration, the positions of the first lens unit L1, the third lens unit L3, and the fifth lens unit L5 in the optical axis direction are specified by a rotation angle information (position information) by a zoom sensor (first detecting unit) 106 for electrically detecting the rotation angle of the zoom ring 105.

Since the fourth lens unit L4 for focus adjustment is held by the third lens unit base barrel 120 via the fourth lens unit barrel 122, the fourth lens unit L4 is driven in the optical axis direction by the VCM 124 while being moved together with the third lens unit base barrel 120 during zooming. In the present invention, a one-on-one correspondence is always maintained between the position of the movable portion of VCM 124 as a driving unit and the position of the fourth lens unit L4 in the optical axis direction. That is, the lens apparatus of the present invention has a configuration which includes no buffer structure such as an elastic member between a member for determining the position of the fourth lens unit L4 in the optical axis direction and the movable portion of the VCM 124.

Figure 5:
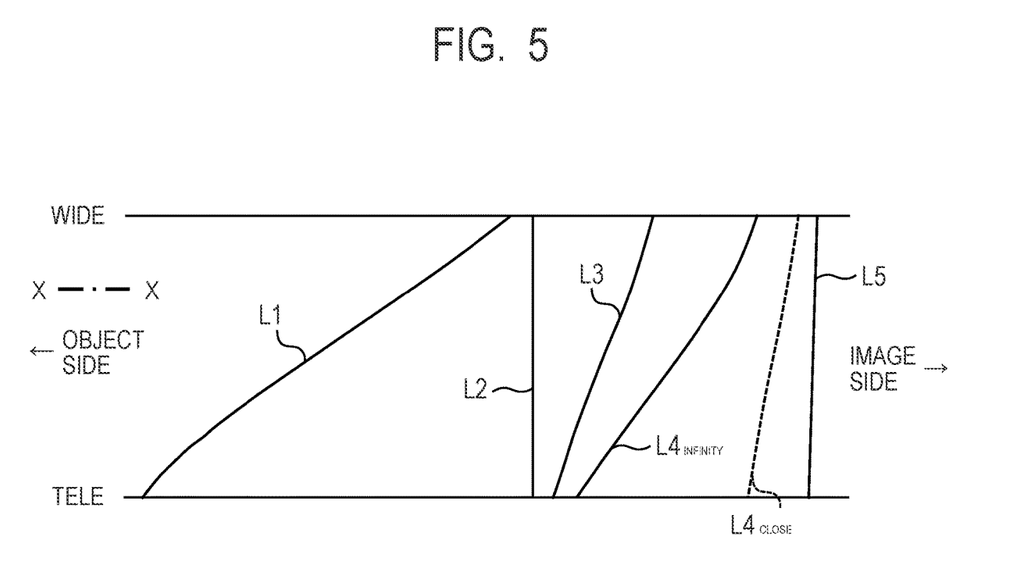
FIG. 5 is a diagram showing movement loci of each lens unit during zooming.

FIG. 5 is a diagram showing movement loci during zooming of the first lens unit L1, the second lens unit L2, the third lens unit L3, the fourth lens unit L4 in states of focusing at infinity and at close distance, and the fifth lens unit L5 by lines L1, L2, L3, L4 infinity, L4 proximity, and L5, respectively.

FIG. 5 shows movement loci of the lens units from the wide angle end to the telephoto end with reference to the mount 101, showing that the first lens unit L1, the third lens unit L3, and the fifth lens unit L5 move during zooming, and the second lens unit L2 does not move for zooming. $L4_{INFINITY}$ indicates a movement locus of the fourth lens unit L4 in the state of focusing at infinity, and $L4_{CLOSE}$ indicates the movement locus in the state of focusing at a predetermined close distance.

The position information of the fourth lens unit L4 focused on an object distance from infinity to a close distance in each focal length from the wide angle end to the telephoto end is stored in controller as data (table). Based on the position information of the fourth lens unit L4 focused on each object distance and the focal length information detected by the zoom sensor 106, the fourth lens unit barrel 122 is driven and controlled by the VCM 124 so as to follow the line shown in FIG. 5.

A scale on which a continuous pattern is formed for position detection is fixed to the fourth lens unit barrel 122. The pattern is read by a position sensor 134 (serving as a second detector) attached to the third lens unit base barrel 120, and the relative position of the fourth lens unit barrel 122 relative to the third lens unit base barrel 120 in the optical axis direction is detected. As described above, the relative position of the fourth lens unit barrel 122 relative to the third lens unit base barrel 120 is detected by a second detection means constituted by a scale on which a continuous pattern fixed to the fourth lens unit barrel 122 is formed and a position sensor attached to the third lens unit base barrel 120.

Further, both ends of the first guide bar and the second guide bar (not shown) are fixed to the third lens unit base barrel 120. The first guide bar is inserted into a sleeve hole provided in the fourth lens unit barrel 122 and holds the fourth lens unit barrel 122 movably in the optical axis direction. The second guide bar engages the U-shaped groove of the fourth lens unit barrel 122 to prevent the fourth lens unit barrel 122 from rotating about the first guide bar.

Hereinafter, a method of driving the focus lens according to the present invention will be described.

Figure 6:
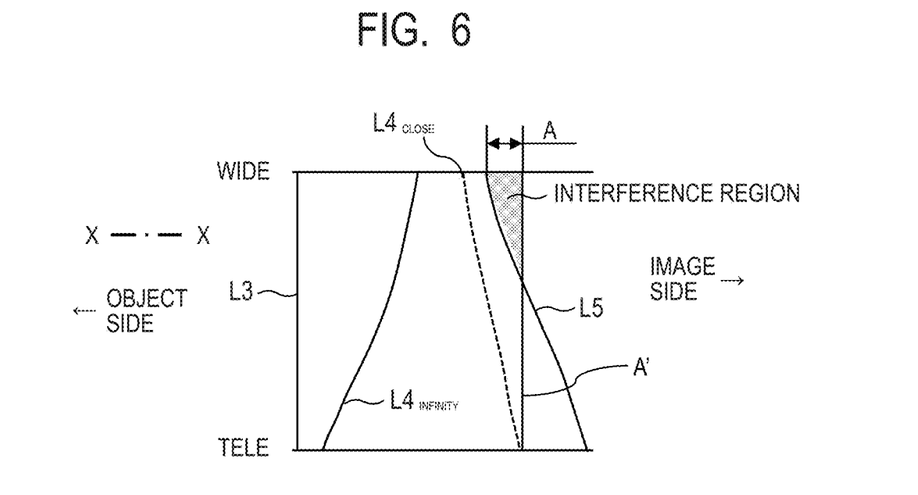
FIG. 6 shows movement loci of a fourth lens unit barrel and a fifth lens unit barrel with reference to a third lens unit base barrel.

FIG. 6 is a diagram showing the movement locus of the fourth lens unit barrel 122 and the fifth lens unit barrel 127 for zoom positions from the wide angle end to the telephoto end with reference to the third lens unit base barrel 120. The distance in optical axis direction between lines indicates the clearance (interval) between the lens barrels of lens units. Therefore, where the lines cross each other, it is indicated that the lens barrels interfere with each other, and it is indicated that the movable range of the fourth lens unit barrel 122 and the movable range of the fifth lens unit barrel 127 overlap each other.

The fourth lens unit barrel 122 serving as a focus lens, is driven and controlled by the VCM 124 so as to follow the line shown as $L4_{INFINITY}$ in FIG. 6 when focused at infinity during zooming. In the state of focusing at the closest distance, the fourth lens unit barrel 122 is driven and controlled so as to trace the broken line indicated as $L4_{CLOSE}$ in FIG. 6. For the intermediate zoom positions between infinity and the closest distance whereas not shown, loci tracing from $L4_{INFINITY}$ to $L4_{CLOSE}$ are stored as data, and the fourth lens unit barrel 122 is driven and controlled according to the stored data based on focal length information based on the zoom sensor 106.

In FIG. 6, the fourth lens unit barrel 122 serving as a focus lens is electrically driven and controlled in accordance with zooming, whereas zooming is performed manually or by an external driving unit. Therefore, when zooming is performed at a high speed, since the drive speed of the focus lens driven by the electric motor is limited, the drive of the focus lens unit may not be in time with the drive speed of zooming by the manual or the external driving unit.

In the present lens apparatus, if zooming to the wide angle end at a high speed from a state of being focused at a close distance in the telephoto end, the driving of the fourth lens unit barrel 122 may not be completed in time and there is a possibility that the fourth lens unit barrel 122 interferes with the fifth lens unit barrel 127. FIG. 6 shows the range of potential interference as an interference region. The maximum amount of interference is an amount of overlapping between a position of the fifth lens unit barrel 127 (line indicated by L5) at the wide angle end (WIDE) and a position of the fourth lens unit barrel 122 (line indicated by $L4_{CLOSE}$) at the telephoto end (TELE) in the optical axis direction, and corresponds to the amount indicated by A in FIG. 6.

The amount of interference depends on the speed of zooming driven manually or an external driving unit and the speed of the actuator of the focus lens in a normal image pickup state. In a case of an interchangeable lens, if the power is cut off by dismounting the interchangeable lens from a camera in a state of being focused at a close distance in the telephoto end, the focus lens cannot be driven, and if, from such state A', the zooming state of the lens is changed to the wide angle end, an interference by the amount of A shown in FIG. 6 is caused.

A case where the fourth lens unit barrel 122 serving as a focus lens interferes with the fifth lens unit barrel 127 will be described below. Since the fourth lens unit barrel 122 is driven by the VCM 124, the holding force is generally small when it is not energized. This is because the frictional force of the fourth lens unit barrel 122 with respect to the first and second guide bars is the holding force. In such a state, when the fifth lens unit barrel 127 collides with the fourth lens unit barrel 122, the fourth lens unit barrel 122 moves in the optical axis direction by an interference amount and retreats in the optical axis direction. A case where zooming is performed while the power is turned off falls into the above.

On the other hand, when the interference occurs while the fourth lens unit barrel 122 is driven in a direction approaching the fifth lens unit barrel 127, the fourth lens unit barrel 122 collides with the fifth lens unit barrel 127 while generating thrust in the direction approaching the fifth lens unit barrel 127. Therefore, the impact at the time of the collision is large, and there are problems in terms of quality such as sound (silence) and vibration (low vibration), and driving accuracy.

In many cases, in driving of the VCM, feedback control is often used in which the position of the fourth lens unit barrel 122 serving as the movable portion is detected by a position sensor and the drive of the VCM 124 is controlled based on the difference between the drive command position and the actual position. In the present embodiment, the feedback control is performed on the basis of the position deviation, but the control may be performed on the basis of the deviation of the velocity/or acceleration, or a combination thereof.

In such feedback control, when the fourth lens unit barrel 122 is stationary at a specific position and the fifth lens unit barrel 127 collides with the fourth lens unit barrel 122, a large deviation from the actual position relative to the command position is generated, and a large thrust is generated to reduce the deviation. However, since the fourth lens unit barrel 122 cannot be moved in a direction where the distance from the fifth lens unit barrel 127 is reduced, there is a possibility that a large driving sound or a collision sound is generated due to an oscillation.

Hereinafter, what kind of control is used to solve these problems, and how accuracy and quality can be improved while miniaturizing the product will be described below.

Figure 7:
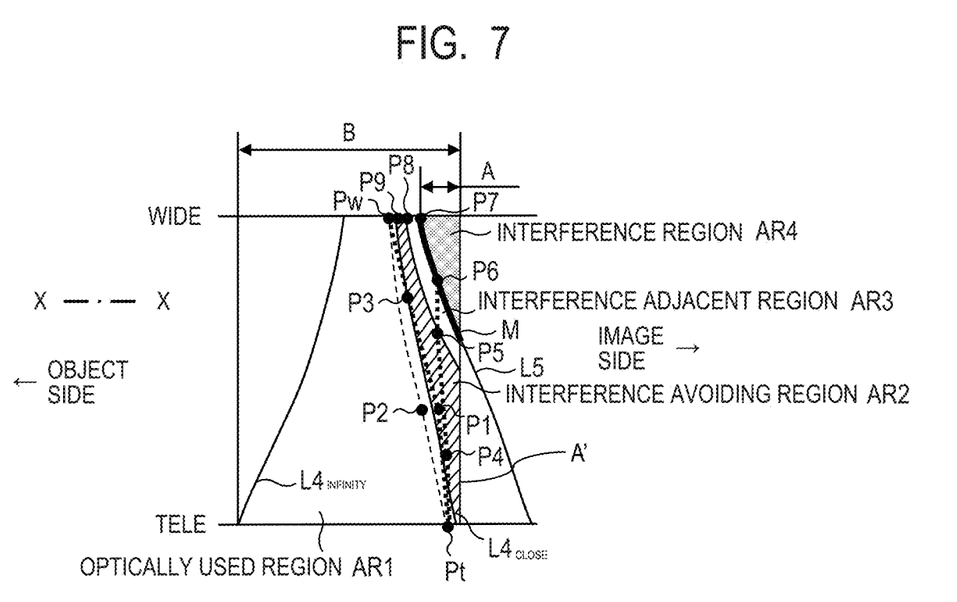
FIG. 7 shows a region for switching controls in FIG. 6.

FIG. 7 is a diagram showing different regions in a control method by a controller described below in each position in a plane defined by a relationship between the position of each lens unit barrel and the zoom positions in the optical axis direction shown in FIG. 6. FIG. 7 shows the movement locus of the fourth lens unit barrel 122 with reference to the third lens unit base barrel 120, and shows that interference region AR4 is a region where an interference between the fourth lens unit barrel 122 and the fifth lens unit barrel 127 can occur. A range in which the fourth lens unit barrel 122 can be moved by driving the VCM is the range B in FIG. 7, and in the present embodiment, the range B is configured to have a wider range than the optically necessary range at the telephoto end (TELE in FIG. 7) to have a margin.

In FIG. 7, AR1, AR2, AR3, and AR4 respectively indicate an optically used region, an interference avoiding region, an interference adjacent region, and an interference region which will be described later. The optically used region AR1 is a region interposed between the $L4_{INFINITE}$ line and the $L4_{CLOSE}$ line in FIG. 7. The interference avoiding region AR2 is a region indicated by a hatched line interposed between the $L4_{CLOSE}$ line and a solid curve in FIG. 7. The interference region AR4 is a region shown as a colored area in FIG. 7, in which an image-side end of an operation range of the fourth lens unit is defined as an image-side end and the movement locus of the fifth lens unit L5 is defined as an object-side end. The interference adjacent region AR3 is a region interposed between the interference avoiding region AR2 and the interference region AR4.

A control method for driving the fourth lens unit barrel by a different controller in each region will be described.

The optically used region AR1 is an optically effective driving region, and is a region in which a subject distance (object distance) specified by the product within a zoom variable range can be focused. That is, the optically used region is a region in which, for the zoom positions from the wide angle end to the telephoto end according to the movement of the zoom lens unit, in-focus state can be obtained on the subject distances from close side end to infinity side end through the movement of the focus lens unit.

In the optically used region AR1, a feedback control is carried out, and the quality of sound during zooming and accuracy are taken into consideration to perform settings. Except a case where an interference occurs during high-speed zooming or turning off the power, control is normally performed within the optically used region. The command value in this region is a position determined from the current zoom position and the previous object distance or the command value from the camera.

Next, the interference region AR4 will be described.

In FIG. 6, the interference region is, for example, the range expressed as the maximum interference amount A at the wide angle end. And, since an interference actually occurs in this range, the movement limit of the fourth lens unit barrel 122 on the image side is regulated by the fifth lens unit barrel 127. Although shown as an area in this figure, the fourth lens unit barrel 122 is not likely to be located within this region, and is actually located on the curve M that is the object-side boundary of the interference region AR4.

In this state, the fourth lens unit barrel 122 cannot move beyond the curve M toward the image side. Therefore, the feedback gain of the feedback controller based on the deviation of the actual position with respect to the command signal is changed between the movement to the direction in which the interference causes and the movement to the direction in which the interference is released. Concretely, the feedback gain at the time of driving in the direction in which the interference causes is made smaller than that at the time of driving in the direction in which the interference is released. Alternatively, an upper limit value of the deviation for the case of driving in the interfering direction may be provided. Alternatively, in the interference region AR4, feedforward control to drive to move to a region on a side of the optically used region instead of feedback control.

Cases such as a case where the interference occurs due to a high-speed zooming and a case where the power supply is turned off, fall under the interference region AR4. However, as described above, the state is controlled to move to the optically used region AR1 side and enters the interference avoiding region AR2.

Next, the interference avoiding region AR2 will be described. As described above, in the interference avoiding region AR2, the control is carried out so as not to enter the interference region AR4 as much as possible when the zooming is performed at a high speed. In other words, even when a high-speed zooming is performed, the fourth lens unit barrel 122 and the fifth lens unit barrel 127 are controlled to avoid collision (contact) with each other. In the interference avoiding region AR2, the feedback gain of the feedback controller is controlled to be higher than that in the optically used region AR1, or the maximum speed or acceleration is controlled to be increased.

The command position at this time is a boundary value of the optically used region AR1 corresponding to the current zoom position of the optically used region AR1, and when the state enters the interference avoiding region AR2 from the optically used region AR1 side by a high-speed zooming, the state is controlled to return to the optically used region AR1 based on the command value. The same command value is obtained when the state is in the interference avoiding region AR2 when the power is turned on or when the state is changed from the interference region AR4 to the interference avoiding region AR2.

Control in the interference adjacent region AR3 is described. The control in the interference adjacent region AR3 depends on whether the state was changed to the interference adjacent region AR3 from the interference avoiding region AR2 or from the interference region AR4.

The interference adjacent region AR3 is a region for controlling to reduce the noise and quality at the time of collision in the case where the state enters the interference region AR4 (curve M) even if controlling so as not to cause interference as much as possible in the interference avoiding region AR2. The specific control in the interference adjacent region AR3 depends on whether the state was changed to the interference adjacent region AR3 from (via) the interference region AR4 or from (via) the interference avoiding region AR2.

First, when entering from the interference avoiding region AR2, the control is carried out for the purpose of the above-described object. As a concrete control, the feedback gain of the feedback controller may be made smaller than that in the optically used region AR1, or an upper limit value of deviation of the feedback control may be set. Alternatively, a drive force to move to the optically used region AR1 may be generated by the feedforward controller, and the drive force may be brought close to zero by the feedforward controller.

On the other hand, when entering from the interference region AR4, the control is carried out by the feedback controller to move to the boundary value in the optically used region corresponding to the current zoom position or the command position input from the camera. Alternatively, a driving force may be generated by the feedforward controller so as to enter a region on the side of the optically used region AR1 (for example, the optically used region AR1 or the interference avoiding region AR2). If the state is in the interference adjacent region AR3 when the power supply is turned on, the same control as described above is carried out.

By performing the above-described control, it is possible to provide a compact lens apparatus in which a movable range of a lens unit electrically driven and a movable range of a lens unit driven manually or by an external driving unit have an overlap portion, and which improves driving accuracy and image quality.

In order to make the above description easy to understand, the change of the control when a high-speed zooming is performed in the telephoto end state will be described below with some examples. For convenience, a case where the zoom ring 105 is rotated at a plurality of different speeds from the telephoto end to the wide angle end will be described with reference to FIG. 7.

First, it is assumed that a high-speed zooming is performed at the position Pt of the telephoto end, and the zoom position and the focus position are moved to the position P1.

When the object distance does not change, the state should be changed to the position P2 in principle, but when zooming is carried out in a high speed, the driving speed of the movable portion 126 (the fourth lens unit barrel 122) does not catch up and the state is moved to the position P1.

Since the state enters the interference avoiding region AR2 at the stage of coming to the position P1, the control parameter of the feedback controller is changed and the focus speed is increased to avoid interference, and the state is changed to the position P3, returns to the optically used region AR1, and reaches the position Pw.

A case where a higher-speed zooming is performed will be described below.

The position Pt is the same position as in the above case, and the state is changed to the position P4 following a locus having a larger delay than the locus described above due to the higher-speed zooming. Since entering the interference avoiding region AR2 from the position P4, the focus speed is increased to avoid the situation, but the driving speed of the movable portion 126 (the fourth lens unit barrel 122) does not catch up with the higher-speed zooming and the state moves to the position P5, and enters the interference adjacent region AR3. In the interference adjacent region AR3, the control is changed in a manner such as reducing the feedback gain, setting the upper limit of deviation, changing the control such as switching from the feedback control to the feedforward control. Thus, the collision sound and vibration can be reduced by giving higher priority to the oscillation avoidance caused by the collision than the collision avoidance. Under such state, the fourth lens unit barrel 122 and the fifth lens unit barrel 127 collide each other (position P6). The fourth lens unit barrel 122 is pushed by the fifth lens unit barrel 127 and is moved to the position P7, and the zoom position comes to the wide angle end.

In this state, since it is in the interference state, a driving force is applied to the fourth lens unit barrel 122 to move to the interference adjacent region AR3 to move to the position P8 and to enter the interference avoiding region AR2. Further, the fourth lens unit barrel 122 is moved to the position P9 and enters the optically used region AR1, and the control parameter of the feedback controller is changed so that the fourth lens unit barrel 122 reaches the position Pw to which the fourth lens unit barrel 122 was originally to be moved by zooming.

By detecting the zoom position and the focus position in this way, the control is changed corresponding to the region determined by the zoom position and the focus position. Thus, the interference between the fourth lens unit barrel 122 (focus lens unit) and the fifth lens unit barrel 127 (zoom lens unit) can be avoided as much as possible, and if it cannot be avoided, driving sound (collision sound) and vibration at the time of collision can be reduced, and the quality of the picked up image can be improved.

In the present embodiment, a description has been given of changing the control method with reference to a diagram determined based on the zoom position and the position of the focus lens in the optical axis direction (based on the detection result of the position detector), but the present invention is not limited thereto.

For example, the region itself may be changed not only by the position but also by the zooming speed. For example, when the zooming speed is high, the interference adjacent region AR3 may be made wider or the control parameter in the interference avoiding region may be changed according to the zooming speed.

In the present embodiment, the control is changed according to the regions including the optically used region AR1, the interference avoiding region AR2, the interference adjacent region AR3, and the interference region AR4.

For example, by dividing the region into two, such as the optically used region AR1 and an optically non-used region which is a region closer to the fifth lens unit L5 than the optically used region AR1, only switching the controller between the feedback controller and the feedforward controller may do. In this case, the interference avoiding region AR2, the interference adjacent region AR3, and the interference region AR4 are treated as one region as the optically non-used region. In this case, the feedback control is applied to the region including the optically used region AR1, and the feedforward control is applied to the region in which the interference may occur, whereby it is possible to prevent generation of a large driving sound or collision sound due to oscillation at the time of interference.

Further, the number of the regions may be more than four, and further quality may be improved by dividing the interference adjacent region into two regions and changing the control parameters. That is, the quality can be further improved by changing the control based on two or more regions defined based on the relationship between the zoom position and the focus position.

In the present embodiment, the feedback control is performed based on the position deviation, but the control may be performed based on the integral or differential, or a combination thereof.

Embodiment 2

Figure 8:
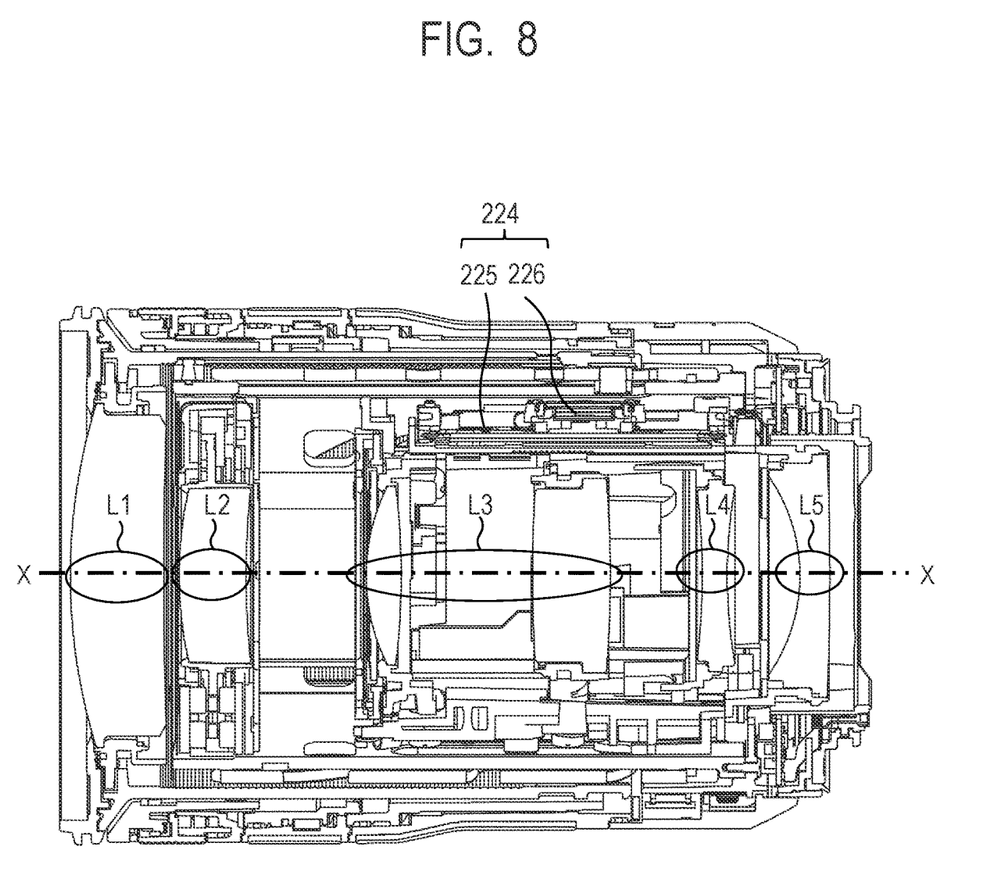
FIG. 8 is a cross-sectional view in a state of focusing infinity in the wide angle end of a lens apparatus of Embodiment 2.
Figure 9:
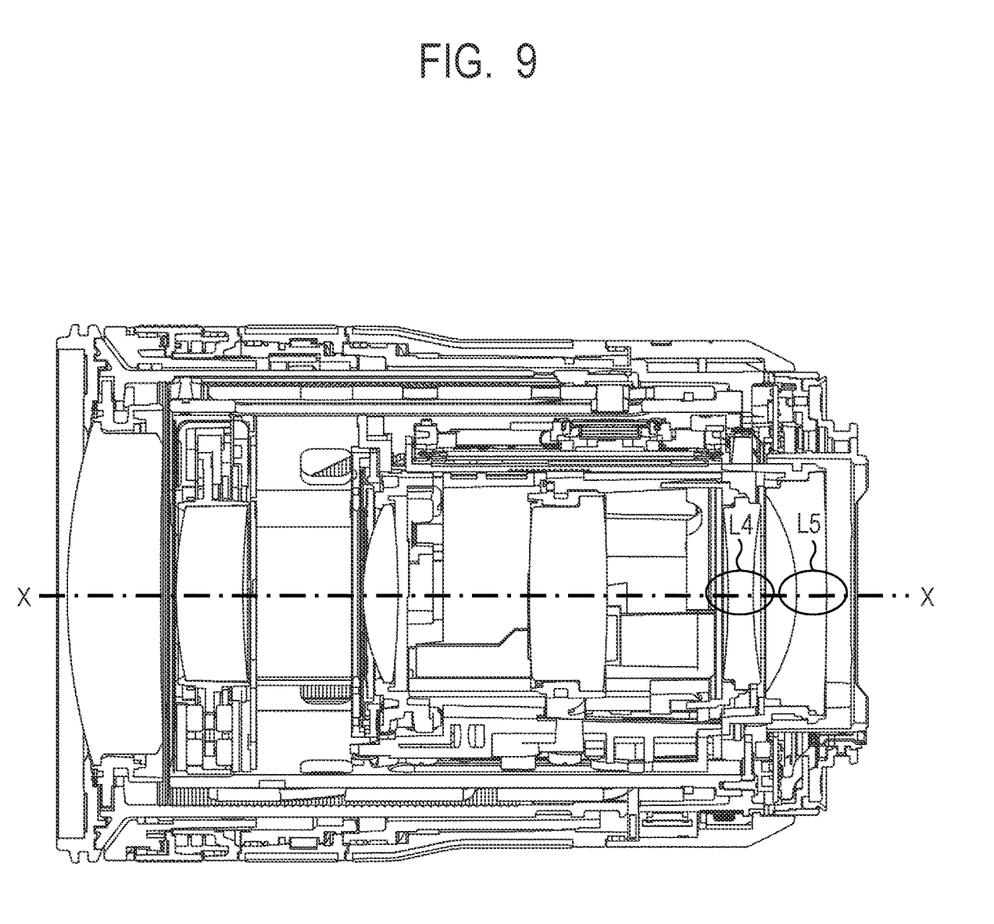
FIG. 9 is a cross-sectional view in a state of focusing at a close distance in the wide angle end of the lens apparatus of Embodiment 2.

FIG. 8 is a sectional view in a state of focusing on an infinity in the wide angle end of the lens apparatus in the second embodiment. FIG. 9 is a sectional view in a state of focusing a close distance in the wide angle end of the lens apparatus of FIG. 8. In the figure, the line indicated by X-X represents the optical axis. Since the movement of each lens unit is the same as that of the first embodiment, description thereof will be omitted.

In Embodiment 1, the drive source for driving the fourth lens unit barrel 122 serving as a focus lens unit is a voice coil motor, but in Embodiment 2, the drive source is a friction drive motor for driving the focus lens unit by friction contact.

The friction drive motor (the vibration wave motor) refers to a motor in which the movable portion is moved by generating a traveling wave represented by an ultrasonic motor, and a motor in which the movable portion is moved in the optical axis direction through expansion and contraction of a piezoelectric element. In the present embodiment, the description is provided with the ultrasonic motor. The ultrasonic motor 224 includes a fixed portion 225 and a movable portion 226, and vibrates the piezoelectric element to drive the movable portion 226 in the optical axis direction.

The difference from the first embodiment is that the holding force is only the friction between the guide bar and the focus lens unit in the case where the drive source is the VCM, whereas the frictional force is generated in the drive unit itself in the case of the friction drive motor.

Therefore, when the interference occurs between the focus unit and the zoom unit during a high-speed zooming, there is a possibility that the friction portion is dragged and the contact portion of the movable portion may be worn. This is different from the VCM. Hereinbelow, what kind of control is used to solve these problems, and how accuracy and quality can be improved while miniaturizing the product will be described below.

Similar to the first embodiment, in the second embodiment, control method is changed depending on the zoom position and the focus position, that are divided into the optically used region AR1, the interference avoiding region AR2, the interference adjacent region AR3, and the interference region AR4 described with reference to FIG. 7. The detailed description of each region with reference to FIG. 7 will be provided, but description for overlapping portions is omitted. The control in the interference adjacent region AR3 which is characteristic relative to the first embodiment will be mainly described. In Embodiment 2, the fourth lens unit barrel 122 is driven by the ultrasonic motor 224. The interference adjacent region AR3 is a region for performing a control under an assumption of a case where inevitably entering the interference region AR4 (curve M) even if performing a control to avoid the interference in the interference avoiding region AR2 as much as possible. In other words, the interference adjacent region AR3 is a region where the control is performed for reducing the sound at the time of collision, improving the quality, and improving the durability of the friction portion of the ultrasonic motor 224. The specific control in the interference adjacent region AR3 depends on whether entering the interference adjacent region AR3 from (via) interference region AR4 or from (via) the interference avoiding region AR2.

First, in the case of entering the interference adjacent region AR3 from the interference avoiding region AR2, the control is performed for the purpose of the above-described object. Specifically, the feedback gain of the feedback controller may be made smaller than that in the optically used region AR1, or an upper limit value of deviation of the feedback control may be provided. Alternatively, a control in which a driving force to move to the optically used region AR1 by the feedforward controller may be generated or the driving force is brought close to zero by a stationary wave driving can be adopted.

On the other hand, when entering the interference adjacent region AR3 from the interference region AR4, the lens apparatus is controlled to have a state in a boundary value of the optically used region corresponding to the current zoom position by a feedback controller or a command position from the camera (focus command position from an external device). Alternatively, a driving force to enter the interference avoiding region AR2 may be generated by the feedforward controller. If the state is in the interference adjacent region AR3 when the power supply is turned on, the same control as described above is carried out.

Since the controls in the other regions are the same as those in the first embodiment, the description thereof will be omitted.

By performing the above-described control, in a lens barrel in which a lens unit which is moved manually or by an external driving unit enters a movable range of a lens unit which is movable by an electric driving unit, it becomes possible to realize the accuracy and quality improvement while realizing the miniaturization of the product.

In the case of the frictional drive motor of the present embodiment, there is a possibility that the frictional portion of the ultrasonic motor 224 may be scratched when the interference occurs during the power-off. In order to avoid such case, when the power supply is turned off, it is possible to control the power supply to be turned off after the position of the focus lens unit is moved to a position where the interference does not occur in any zoom position.

In Embodiments 1 and 2, the control of the VCM and the friction drive motor for obtaining drive thrust by electromagnetic force has been described, but other drive motors or combinations thereof may be used. For example, although the VCM is used as the driving source, in a configuration in which the friction portion is provided separately, the control of the VCM friction portion can be changed according to the aforementioned regions.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Figure 10:
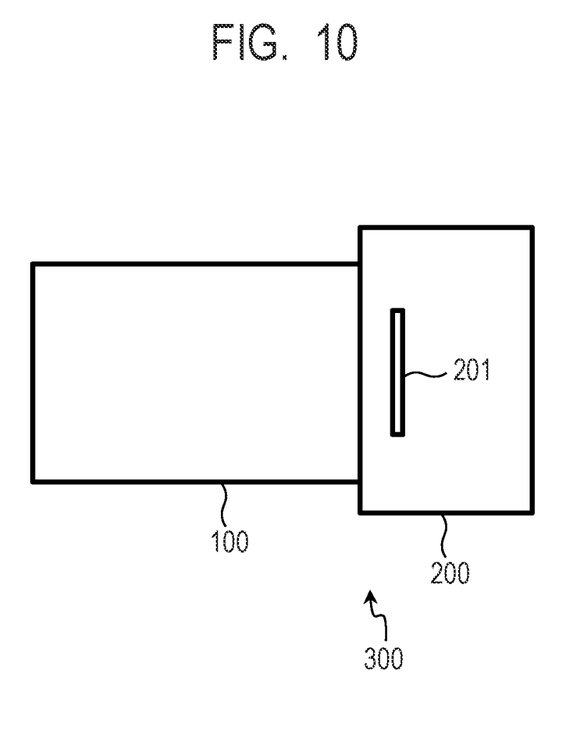
FIG. 10 shows an image pickup apparatus having a lens apparatus of the present invention.

An image pickup apparatus 300 (FIG. 10) having a lens apparatus 100 according to the embodiments and a camera apparatus 200 having an image pickup element 201 for picking up an image formed by the lens apparatus 100 can realize an image pickup apparatus having the beneficial effects of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-049738, filed Mar. 24, 2021, which is hereby incorporated by reference herein in its entirety.

What is claimed is:

1. A lens apparatus comprising:
a first holding member holding one lens unit and configured to be moved in a direction of an optical axis;
a second holding member holding another lens unit and configured to be moved in the direction of the optical axis;
a first detector configured to detect a position of the first holding member;
a second detector configured to detect a position of the second holding member;
a driving unit configured to use electricity to move the second holding member in the direction of the optical axis; and
a controller configured to control the driving unit,
wherein the first holding member is movable manually or by an external driving unit not included in the lens apparatus,
wherein a movable range of the first holding member and a movable range of the second holding member include:
an effective region that is effective for picking up image;
an overlapping region where the movable ranges of the first and second holding members overlap each other in the direction of the optical axis; and
an intermediate region between the effective region and the overlapping region, and wherein the controller changes a control of the driving unit in the intermediate region based on detection results of the first detector and the second detector to prevent the second holding member from interfering with the first holding member.

2. The lens apparatus according to claim 1, wherein the controller changes the control of the driving unit between in the effective region and in the intermediate region.

3. The lens apparatus according to claim 2, wherein the controller changes the control of the driving unit ito at least one of:
a change between a feedback control and a feedforward control,
a change of a gain in the feedback control,
a change of a maximum speed in the feedback control, or
a change of an acceleration in the feedback control.

4. The lens apparatus according to claim 1, wherein the controller performs a feedback control in the effective region and performs a feedforward control in the intermediate region.

5. The lens apparatus according to claim 1, wherein the controller performs a feedback control in the interference region so that a gain for driving in a direction in which the first holding member and the second holding member interfere with each other is smaller than a gain for driving in an opposite direction in which the first holding member and the second holding member do not interfere with each other.

6. The lens apparatus according to claim 1, wherein the controller performs a feedback control in the interference region and sets an upper limit value for deviation of the feedback control when driving in a direction in which the first holding member and the second holding member interfere each other.

7. The lens apparatus according to claim 1, wherein the controller performs a feedforward control in the interference region and controls the driving unit to move the second holding member to a side of the effective region.

8. The lens apparatus according to claim 1, wherein:
the intermediate region includes an overlapping adjacent region, and
in a case of changing from the effective region to the overlapping adjacent region, the controller performs a feedback control with a gain smaller than a gain in the effective region, a feedback control with an upper limit value set to a deviation, or a feedforward control to move to the effective region.

9. The lens apparatus according to claim 1, wherein:
the intermediate region includes an overlapping adjacent region, and
in a case of changing from the overlapping region to the overlapping adjacent region, the controller performs a feedback control with a boundary value between the effective region and the overlapping adjacent region at a current zoom position or with a focus command position input from an outside as a command position, or a feedforward control to move to a region on a side of the effective region.

10. The lens apparatus according to claim 1, wherein:
the intermediate region includes an overlapping adjacent region and an overlapping avoiding region, which is between the effective region and the overlapping adjacent region, and
in the overlapping avoiding region, the controller performs a feedback control, adopting a boundary value between the overlapping avoiding region and the effective region at the current zoom position as a command position, with a gain greater than a gain in the effective region, or a feedback control with a maximum speed greater than a maximum speed in the effective region or with an acceleration greater than an acceleration in the effective region.

11. The lens apparatus according to claim 10, wherein a boundary between the interference adjacent region and the interference avoiding region varies based on a detection result of the first detector.

12. The lens apparatus according to claim 1, wherein the driving unit comprises a voice coil motor.

13. The lens apparatus according to claim 1, wherein:
the driving unit comprises a vibration wave motor,
the intermediate region includes an overlapping adjacent region, and
in a case of changing from the effective region to an overlapping adjacent region, the controller performs a feedback control with a gain smaller than a gain in the effective region, a feedback control with an upper limit value for deviation being set, a stationary wave driving, or a feedforward control to move to the effective region.

14. The lens apparatus according to claim 1, wherein:
the one lens unit is configured to be moved for zooming,
the another lens unit is configured to be moved for a focus adjustment, and
the effective region is where any object distance from a close end to an infinity is focusable by a movement of the second lens unit at any zoom position from the wide angle end to the telephoto end due to a movement of the one lens unit.

15. The lens apparatus according to claim 1, wherein a position of the second holding member detected by the second detector is a relative position of the second holding member with respect to first holding member.

16. An image pickup apparatus comprising:
the lens apparatus according to claim 1; and
an image pickup element configured to pick up an image formed by the lens apparatus.

17. A method of controlling a lens apparatus by a controller of the lens apparatus, wherein:
the lens apparatus comprises:
a first holding member holding one lens unit and configured to be moved in a direction of an optical axis;
a second holding member holding another lens unit and configured to be moved in the direction of the optical axis;
a first detector configured to detect a position of the first holding member;
a second detector configured to detect a position of the second holding member;
a driving unit configured to use electric to move the second holding member in the direction of the optical axis; and
the controller configured to control the driving unit,
a movable range of the first holding member and a movable range of the second holding member include:
an effective that is effective for picking up an image;
an overlapping region where the movable ranges of the first and second holding members overlap each other in the direction of the optical axis; and
an intermediate region between the effective region and the overlapping region, and
the method comprises changing a control of the driving unit in the intermediate region based on detection results of the first detector and the second detector to prevent the second holding member from interfering with the first holding member.

18. A non-transitory computer-readable medium storing a program executable by a processor to execute a method of controlling the lens apparatus according to claim 17.

* * * * *